(12) United States Patent
Pichler

(10) Patent No.: US 8,607,698 B2
(45) Date of Patent: Dec. 17, 2013

(54) FRUIT PRESS

(75) Inventor: Josef Pichler, Alberndorf (AT)

(73) Assignee: Technic-Marketing-Products GmbH, Linz (AT)

( * ) Notice: Subject to any disclaimer, the term of this patent is extended or adjusted under 35 U.S.C. 154(b) by 238 days.

(21) Appl. No.: 13/136,249

(22) Filed: Jul. 27, 2011

(65) Prior Publication Data

US 2012/0024172 A1  Feb. 2, 2012

(30) Foreign Application Priority Data

Jul. 28, 2010  (AT) ................. A 1269/2010

(51) Int. Cl.
*A23N 1/02* (2006.01)
*B30B 9/20* (2006.01)

(52) U.S. Cl.
USPC .................. 100/96; 100/208; 99/584

(58) Field of Classification Search
USPC ......... 100/96, 98 R, 116, 127, 213, 218, 208; 99/502, 503, 504, 505, 506, 507, 508, 99/584; D7/665, 666, 669
See application file for complete search history.

(56) References Cited

U.S. PATENT DOCUMENTS

| | | | |
|---|---|---|---|
| 2,602,479 A | | 7/1952 | Trainor |
| 5,170,699 A | * | 12/1992 | Senalada .................. 99/504 |
| 5,313,879 A | * | 5/1994 | Otto ....................... 99/504 |
| 5,445,067 A | * | 8/1995 | Font ....................... 99/502 |

FOREIGN PATENT DOCUMENTS

ES          2 189 556        7/2003
WO     WO 2004/052126        6/2004

* cited by examiner

*Primary Examiner* — Jimmy T Nguyen
(74) *Attorney, Agent, or Firm* — Collard & Roe, P.C.

(57) ABSTRACT

A fruit press includes a housing removably arranged on a frame and enclosing a pressing chamber, parallel shafts mounted in the frame and protruding into the pressing chamber, for two press rollers which can be driven in opposite directions and which include semi-spherical press recesses distributed over the circumference and for two press heads provided beneath the press rollers, which can be driven in opposite directions in relation to the press rollers, and form spherical press punches cooperating with the press recesses, a knife displaceable along a guide between the press rollers, and a detachable securing device against withdrawal for the press rollers and press heads; which are slid axially onto their conical shafts. The pressing chamber includes a rear wall detachably fastened to the frame, penetrated in a liquid-tight manner by the shafts for the press rollers and press heads, and carrying the guide for the knife.

2 Claims, 3 Drawing Sheets

US 8,607,698 B2

FRUIT PRESS

CROSS REFERENCE TO RELATED APPLICATIONS

Applicant claims priority under 35 U.S.C. §119 of Austrian Application No. A 1269/2010 filed on Jul. 28, 2010, the disclosure of which is incorporated by reference.

BACKGROUND OF THE INVENTION

1. Field of the Invention

The invention relates to a fruit press, comprising a housing which is removably arranged on a frame and encloses a pressing chamber, parallel shafts which are mounted in the frame and protrude into the pressing chamber, on the one hand for two press rollers which can be driven in opposite directions and which comprise semi-spherical press recesses distributed over the circumference and on the other hand for two press heads which are provided beneath the press rollers, can be driven in opposite directions in relation to the press rollers, and form spherical press punches which cooperate with the press recesses of the press rollers, a knife which is displaceable along a guide between the press rollers, and a detachable securing means against withdrawal for the press rollers and press heads which are slid axially onto their conical shafts.

2. Description of the Related Art

In known fruit presses of this kind (WO 2004/052126 A1) a pressing chamber is provided with two adjacently arranged press rollers and two press heads which are associated with these press rollers and respectively form a pressing tool and which are equipped spherical press punches. As a result of the rotation of the mutually associated press rollers and press heads of the two pressing tools in opposite directions, the press punches engage in semi-spherical press recesses of the press rollers. The fruit to be pressed, which is usually shell fruit such as oranges, is usually supplied to the intermeshing zone between the adjacently arranged press rollers where it is received by the press recesses of the press rollers and is conveyed between the press rollers to the press heads disposed beneath the press rollers. Since a knife is provided between the press rollers which is lifted to perform a cutting stroke against the direction of conveyance of the fruit by way of driving cams of the press heads, the fruit is cut in half so that during the further rotation of the press rollers press punches engaging in the press recesses will press out the fruit halves. In order to strip off the skin of the fruit adhering to the press punches, stripping members are provided on the mutually averted sides of the press heads which engage with a sword-like stripping finger in a circumferential groove of the press punches when the press heads rotate past said finger, so that the skin halves of the fruit will move onto the stripping finger and will be detached from the press punch in order to be carried off to a collecting container along a deflection surface of the stripping members.

For the necessary cleaning of the pressing chamber, it is necessary at first to remove the housing from the supporting frame before the press punches and the press rollers can be removed for cleaning from their respective shafts which are held with the drive in the frame. Although the knife and stripping members are detachably mounted and can therefore be cleaned with the press punches and the press rollers together with the housing outside of the pressing chamber in a dishwasher for example, the effort invested in the cleaning work to be performed in the region of the frame remains comparatively high because the frame forms the rear wall of the pressing chamber.

SUMMARY OF THE INVENTION

The invention is therefore based on the object of providing a fruit press of the kind mentioned above in such a way that they regularly performed cleaning work can be reduced to a minimum.

This object is achieved by the invention in such a way that the pressing chamber comprises a rear wall which is detachably fastened to the frame, penetrated in a liquid-tight manner by the shafts for the press rollers and press heads, and carries the guide for the knife.

By providing a rear wall for the pressing chamber which seals the frame from the pressing chamber the frame can no longer be contaminated by fruit juice or pulp ejected from the fruit during pressing, so that simple cleaning conditions can be ensured outside of the pressing chamber when all constructional parts can be removed on the side of the rear wall which faces away from the frame. This is easily provided for the press rollers and press heads axially inserted on their shafts, but not for the knife which is displaceably held between the press heads along a guide. For this reason, it is not the frame that is provided with the guidance for the knife but the rear wall of the pressing chamber. After the detachment from the frame, the rear wall can be withdrawn for cleaning together with the guide for the knife along the shafts for the press rollers and press heads, thus rendering otherwise necessary cleaning work in the frame area superfluous.

The mounting of the stripping members for the skin of the fruit could also be associated with the rear wall like the knife guide. In order to prevent the resulting more complex construction and cleaning of the rear wall, the frame can comprise two arbors which are parallel to the shafts for the press heads and penetrate the rear wall of the pressing chamber in a fluid-tight manner for pivotably bearing two stripping members which are arranged in the region of the circular orbits of the press punches for the skins of the fruit received by the press punches, so that the stripping members merely need to be withdrawn from their bearing arbors before the rear wall itself can be withdrawn.

BRIEF DESCRIPTION OF THE DRAWINGS

The subject matter of the invention is shown in the drawings by way of example, wherein.

DETAILED DESCRIPTION OF THE PREFERRED EMBODIMENTS

Figure 1:
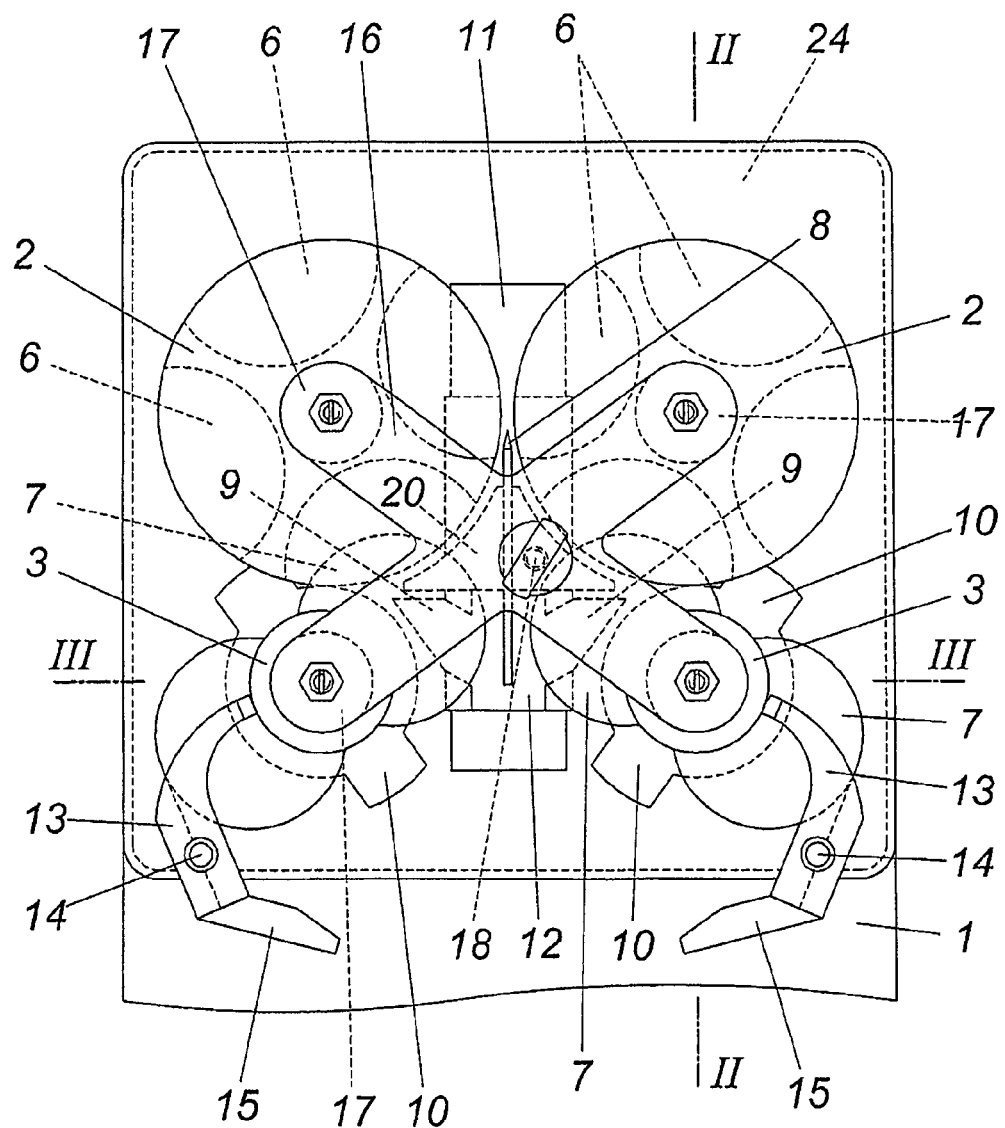
FIG. 1 shows a front view of a fruit press in accordance with the invention with removed housing.

The illustrated fruit press comprises a frame 1 in which two press rollers 2 are mounted and beneath these press rollers 2 two press heads 3 cooperating with each other are mounted on parallel shafts 4 and 5. The press rollers 2 are provided with four semi-spherical press recesses 6 which are distributed over the circumference and which cooperate with spherical press punches 7.

In the intermeshing zone between the two press rollers 2 a knife 8 is displaceably mounted to be height-adjustable, which knife can be displaced in a guide 11 by way of driving cams 10 which revolve with the press heads 3 and cooperate with the knife stops 9. The knife 8 is fastened for this purpose in a carriage 12 held on the guide 11. The fruit which is supplied to the intermeshing zone between the press rollers 2 from above and which is received by the press recesses 6 that are upwardly open in the received position are moved during the downwards conveyance by the press rollers 2 past the knife 8 which is moved upwardly in the opposite direction and which severs the fruit, so that the severed fruit is subsequently pressed out in these press recesses 6 by the press punches 7 engaging in said press recesses 6. The remaining skin halves with the fruit residues adhere to the press punches 7 and are removed with the press punches 7 out of the press recesses 6 of the press rollers 2.

In order to strip off the skins of the fruit from the press punches 7, stripping members 13 are provided on the mutually averted sides of the two press heads 3 in the region of the orbits of the press punches 7, which stripping members are rotatably held on arbors 14 which are parallel to the shafts 5 of the press heads 3 and are provided with a stop moment by way of additional weights 15.

In order to detachably hold the press rollers 2 and the press heads 3 on the conical shafts 4 and 5 which are arranged as multi-edge shafts, an axial securing means against withdrawal is provided which comprises a common support 16 with axial stops 17 for the press rollers 2 and the press heads 3. A support pin 18 is used for fastening the common support 16, which support pin penetrates the support 16 with a threaded portion, so that the support 16 can be tensioned with the help of a fastening nut 19 under axial pressurization of the press rollers 2 and the press heads 3. As a result of this constructional configuration, the withdrawal of the press rollers 2 and the press punches 3 from the associated shafts 4, 5 for cleaning and maintenance purposes is simple. It is merely necessary to remove the support 16 with the stops 17 after detaching the fastening nut 19 from the support pin 18 in order to enable the axial removal of the press rollers 2 and the press heads 3 from the shafts 4, 5. For mounting the press rollers 4 and the press heads 5 it is merely necessary to proceed in reverse order. Not only the rotational entrainment is ensured by the flattened portions of the shafts 4, 5, but also the proper mutual rotational position of the press rollers 2 and the press heads 3.

The support pin 18 can also be used for fixing a sliding guide 20 for the severed fruit in a fixed manner to the frame in order to enable the axial withdrawal of the sliding guide 20 penetrated by the knife 8 from the support pin 18.

Figure 2:
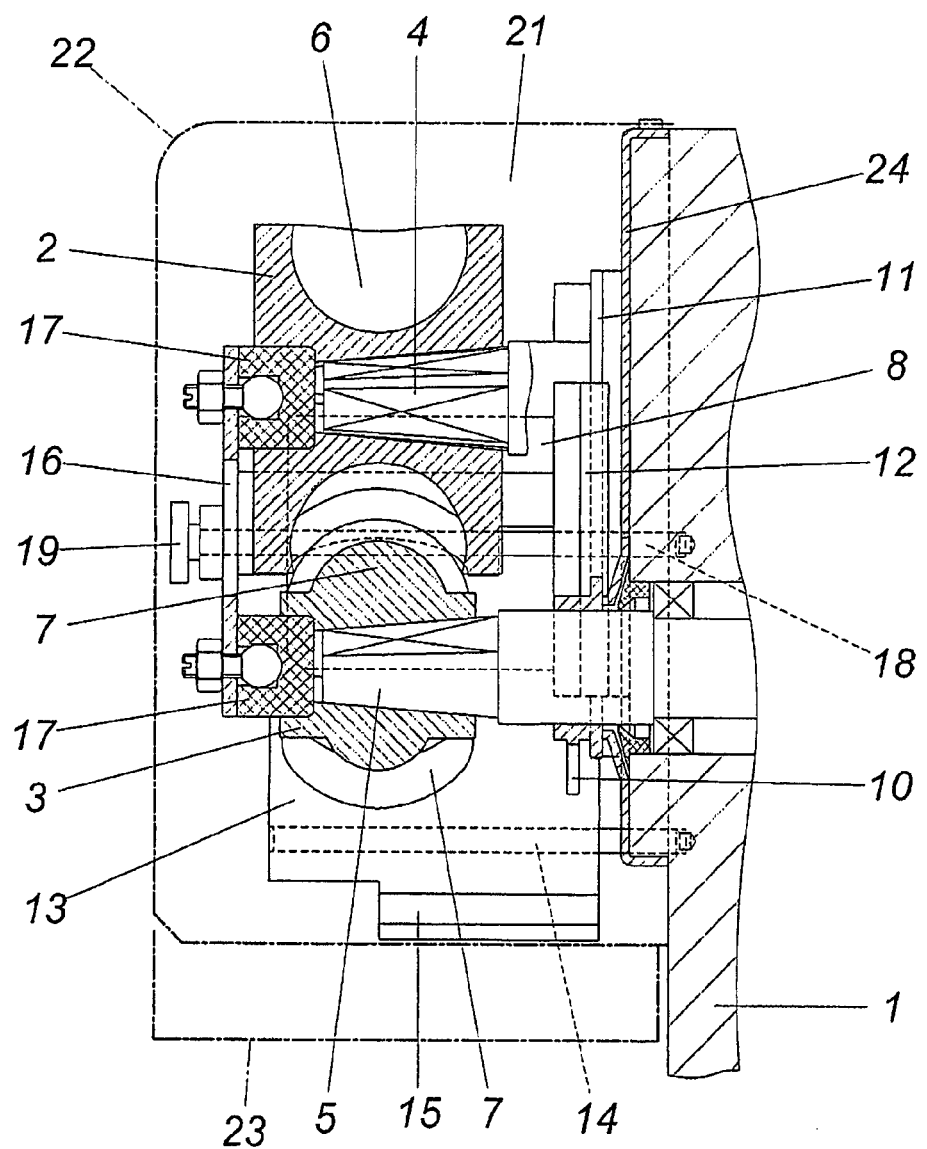
FIG. 2 shows the fruit press in a sectional view along the line II-II of FIG. 1 and FIG. 3 this fruit press in a sectional view along the line III-III.
Figure 3:
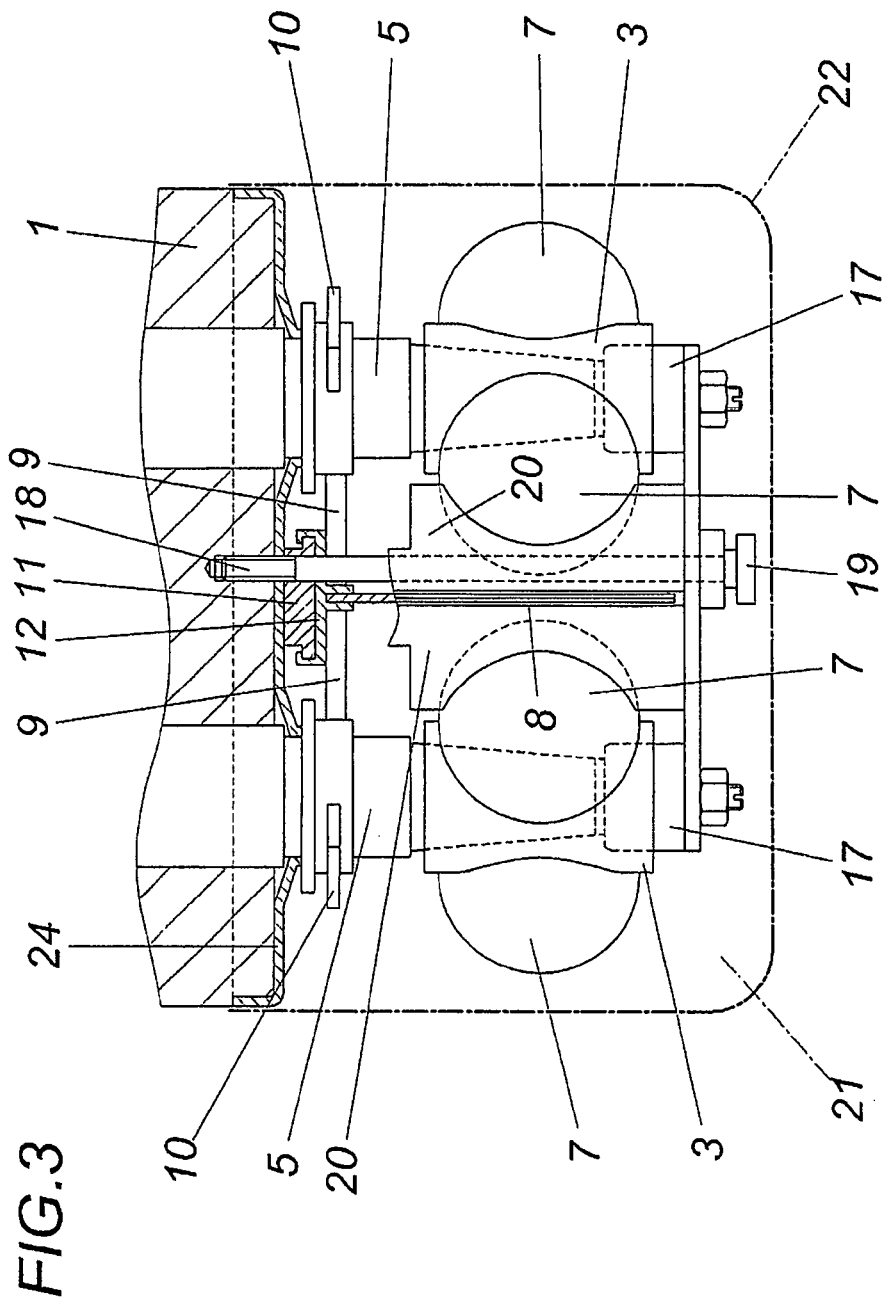

The press rollers 2 and the press heads 3 are arranged together with the stripping members 13 in a pressing chamber 21 which is closed off towards the outside by a housing 22 shown with the dot-dash line. The floor of the pressing chamber 21 is formed by a collecting basin which is indicated in FIG. 2 by the dot-dash line and which is provided with breakthroughs for the removal of the skins of the front on the one hand and for collecting be pressed fruit juice on the other hand. In contrast to conventional pressing chambers, the pressing chamber 21 in accordance with the invention comprises a separate rear wall 24 which is disposed in front of the frame 1 and which is penetrated by the shafts 4, 5 for the press rollers 2 and press heads 3 in a fluid-tight manner and which can be withdrawn from the frame 1 in the direction of these shafts 4, 5. Due to the required stability it is also recommended that the support pin 19 and the arbors 14 for this stripping members 13 are mounted in the frame 1 and are guided in a fluid-tight manner through the rear wall 24. It is merely necessary to arrange the guide 11 for the carriage 12 of the knife 8 on the rear wall itself in order to remove all constructional parts from the frame 1 which are contaminated by pressed juice or press residues by removing the rear wall 24 and to subject them to preferably mechanical cleaning outside of the frame 1.

For this purpose, the housing 22 and the collecting basin 23 are removed from the frame 1 before the press rollers 2 and the press heads 3 as well as the sliding guide 20 for the severed fruit and the stripping members 13 can be removed after detaching the support 16. Finally, the rear wall 24 with the guide 11 and the carriage 12 for the knife 8 can be withdrawn from the shafts 2, 3, whereupon the carriage 12 can be slid out of the guide 11. In order to mount the cleaned parts it is necessary to proceed in reverse order.

The invention claimed is:

1. A fruit press, comprising a housing (22) which is removably arranged on a frame (1) and encloses a pressing chamber (21), parallel shafts (4, 5) which are mounted in the frame (1) and protrude into the pressing chamber (21), on the one hand for two press rollers (2) which can be driven in opposite directions and which comprise semi-spherical press recesses (6) distributed over the circumference and on the other hand for two press heads (3) which are provided beneath the press rollers (2), can be driven in opposite directions in relation to the press rollers (2), and form spherical press punches (7) which cooperate with the press recesses (6) of the press rollers (2), a knife (8) which is displaceable along a guide (11) between the press rollers (2), and a detachable securing means against withdrawal for the press rollers (2) and press heads (3) which are slid axially onto their conical shafts (4, 5), wherein the pressing chamber (21) comprises a rear wall (24) which is detachably fastened to the frame (1), penetrated in a liquid-tight manner by the shafts (4, 5) for the press rollers (2) and press heads (3), and carries the guide (11) for the knife (8).

2. A fruit press according to claim 1, wherein the frame (1) comprises two arbors (14) which are parallel to the shafts (5) for the press heads (3) and penetrate the rear wall (24) of the pressing chamber (21) in a fluid-tight manner for pivotably bearing two stripping members (13) which are arranged in the region of the circular orbits of the press punches (7) for the skins of the fruit received by the press punches (7).

* * * * *